(12) United States Patent
Jimerson

(10) Patent No.: US 6,415,569 B1
(45) Date of Patent: Jul. 9, 2002

(54) FLEX-O-PLUG

(75) Inventor: Dwane Matthew Jimerson, Topeka, KS (US)

(73) Assignee: Dwane M. Jimerson, Topeka, KS (US)

( * ) Notice: Subject to any disclaimer, the term of this patent is extended or adjusted under 35 U.S.C. 154(b) by 0 days.

(21) Appl. No.: 09/310,591

(22) Filed: May 12, 1999

(51) Int. Cl.7 .................................................. E04B 2/00
(52) U.S. Cl. .................... 52/287.1; 52/288.1; 174/72 C; 174/72 R; 174/86; 174/68.1; 174/97
(58) Field of Search .............................. 52/287.1, 288.1; 174/72 R, 72 C, 86, 48, 68.1, 95, 97; 264/1.5; 385/105, 110

(56) References Cited

U.S. PATENT DOCUMENTS 1,825,010 A * 2/1931 Murphy ..................... 52/288.1

* cited by examiner

*Primary Examiner*—Carl D. Friedman
*Assistant Examiner*—Christy M Syres
(74) *Attorney, Agent, or Firm*—Bruce J. Clark; Stephen A. Jones; Lori D. Tolly

(57) ABSTRACT

A Sectional Conduit that would enhance ones home or office. The Sectional Conduit promotes a touch of class and elegance to your surrounding, as well as promoting safety.

2 Claims, 5 Drawing Sheets

*A1=stems*

B1- small
Arm/joint
C1=insertion of b1

FIGURE 8
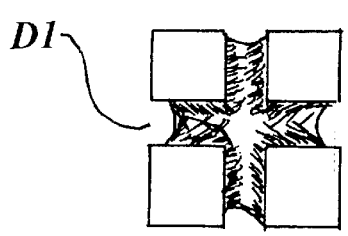
FIGURE 9
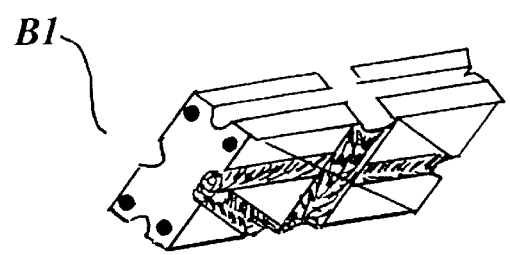
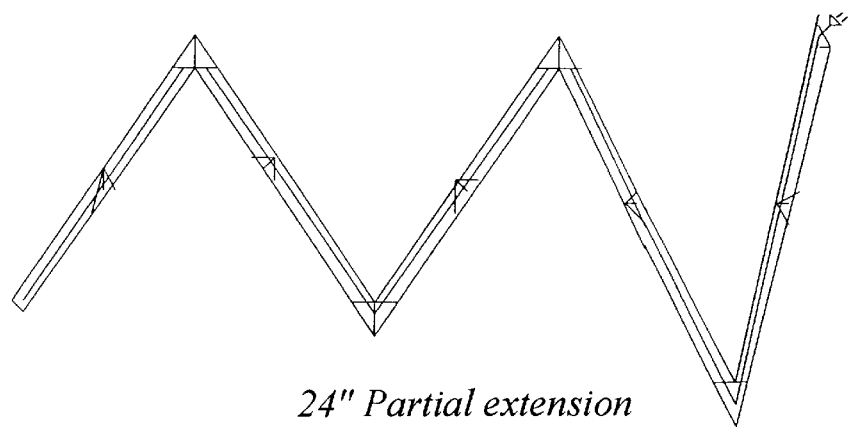
*24" Partial extension*
FIGURE 10
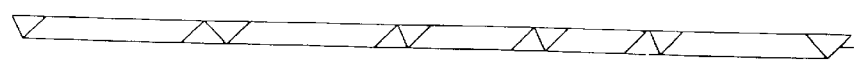
*Full extension 24"*
FIGURE 11

FLEX-O-PLUG

BACKGROUND OF THE INVENTION

This invention relates to the need of everyday house keeping. Rather it be a office, business, or home. While at the same time beautifying and enhancing any area.

This invention is unique in that not only would it enhance any area, but also gives one a sense of completion.

BRIEF SUMMARY OF THE INVENTION

This invention will beautify any home, business, or office. The FLEX-O-PLUG(Sectional Conduit) is a cover of connecting sections. The design of the Sectional Conduit is similar to a long narrow horizontal layout in dimension, with rotating triangle cubes on each Sectional Conduit with a rotating triangle cube on each section. It's designed to cover extension cords and cords from various appliances and lamps. By inserting the cord in the prescribed area on each section. It's made of durable flexible plastic. On each end of every 6 inch section there's a rotating cube. Each complete section is 1 feet in length with a 360 degree rotating cube on every (Sectional Conduit). Each section can be removed for < or > length to accommodate in person each persons needs. The maximum length of the FLEX-O-PLUG(Sectional Conduit) is 24 feet. The FLEX-O-PLUG(Sectional Conduit) comes with sets of FLEX stickers to accommodate various usage boards, up and down walls, and across ceilings. There are separate sets of FLEX stickers to accommodate. The FLEX-O-PLUG(Sectional Conduit) comes in 8 colors black, brown, royal blue, burgundy, white, gray, cream, and gold.

DETAILED DESCRIPTION OF THE INVENTION

Figure 1:
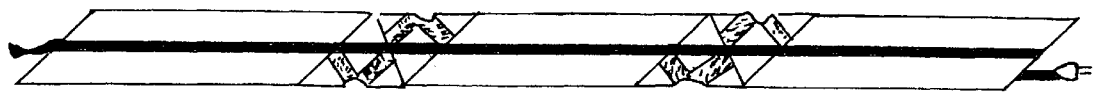
FIG. 1 is a small segment of the extended side view of the FLEX-O-PLUG(Sectional Conduit) with grooves showing and connections every 6 inches.
Figure 2:
FIG. 2 is a small segment of the extended bottom view of the FLEX-O-PLUG(Sectional Conduit) with grooves showing and connections every 6 inches. The view and placement of the extension cord or cords throughout the FLEX-O-PLUG(Sectional Conduit) is exposed.

In reference to FIG. 1 and FIG. 2 on page 1 here are detailed descriptions of the critical components of the FLEX-O-PLUG operations and its use.

Figure 3:
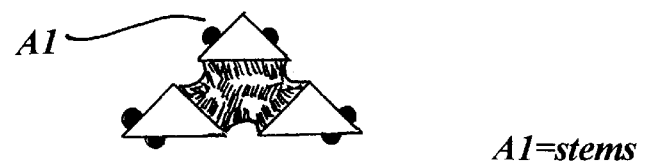
Figure 4:
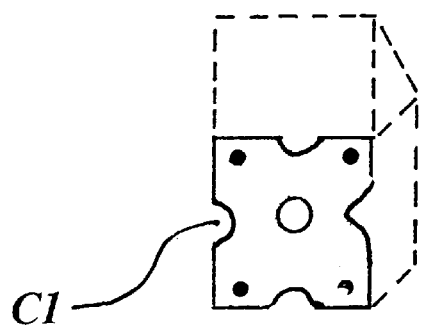

FIG. 2 Page 1 describes a basic side view design of a single rotating cube that will be at the end of every 6 inch section. Notice the grooves on the cube, there to allow various paths for a cord to continue through. Also there are locking stems on every corner of each rotating cube. See A1 in FIG. 3 page 1. FIG. 9 B1 page 4 shows the small arm attached to a ball joint for easy connection of each section by snapping each joint together for < or > length. See FIG. 4C is for insertion of FIG. 5.

FIG. 8 Page 4 describes the bottom view of a rotating cube alone with the various slots placed alone all sides of each rotating cube and throughout the FLEX-O-PLUG(Sectional Conduit). These slots are there for the cords to run thoroughout. Each slot is <2/16 width for a tight fit for the cord. See D1 in FIG. 8

Figure 5:
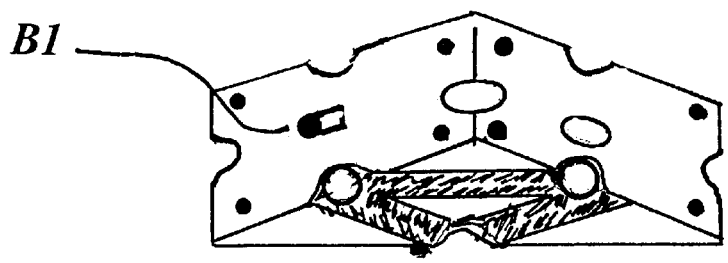

FIG. 5 Page 2 shows a 3D view of a rotating cube with all slots exposed, with stems, and arm joint exposed.

Figure 6:
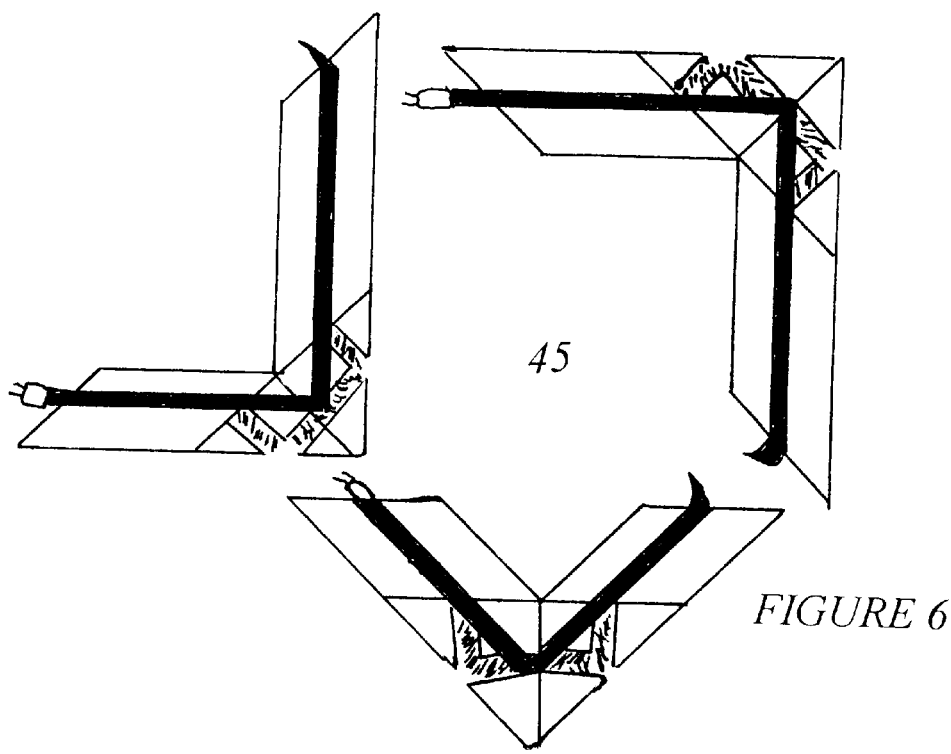
Figure 7:
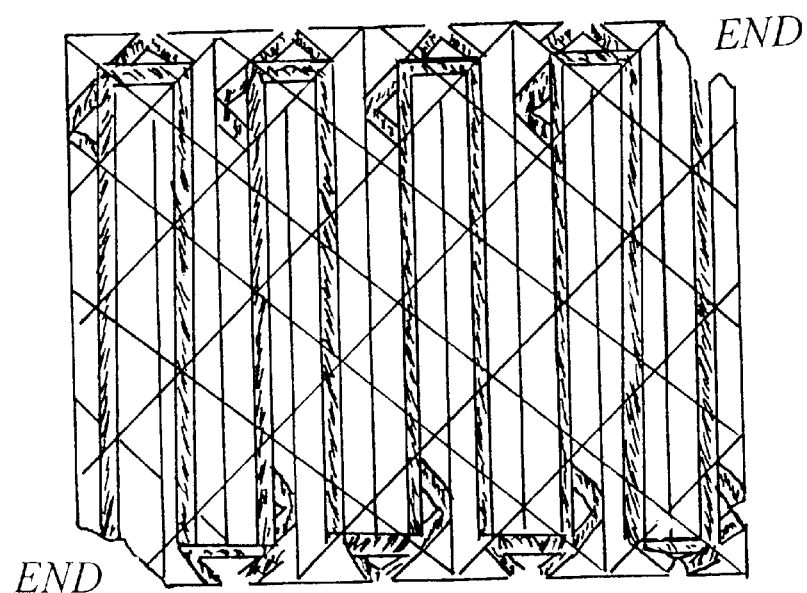

FIG. 6 Page 3 demonstrates the various angles one can arrange to suit their needs; and demonstrates the capability of each rotating cube on each 6 inch section end. One can also notice the path of the cord throughout the FLEX-O-PLUG(Sectional Conduit). Also See FIG. 7 page 3 for easy storage of the FLEX-O-PLUG(Sectional Conduit).

Figure 12:
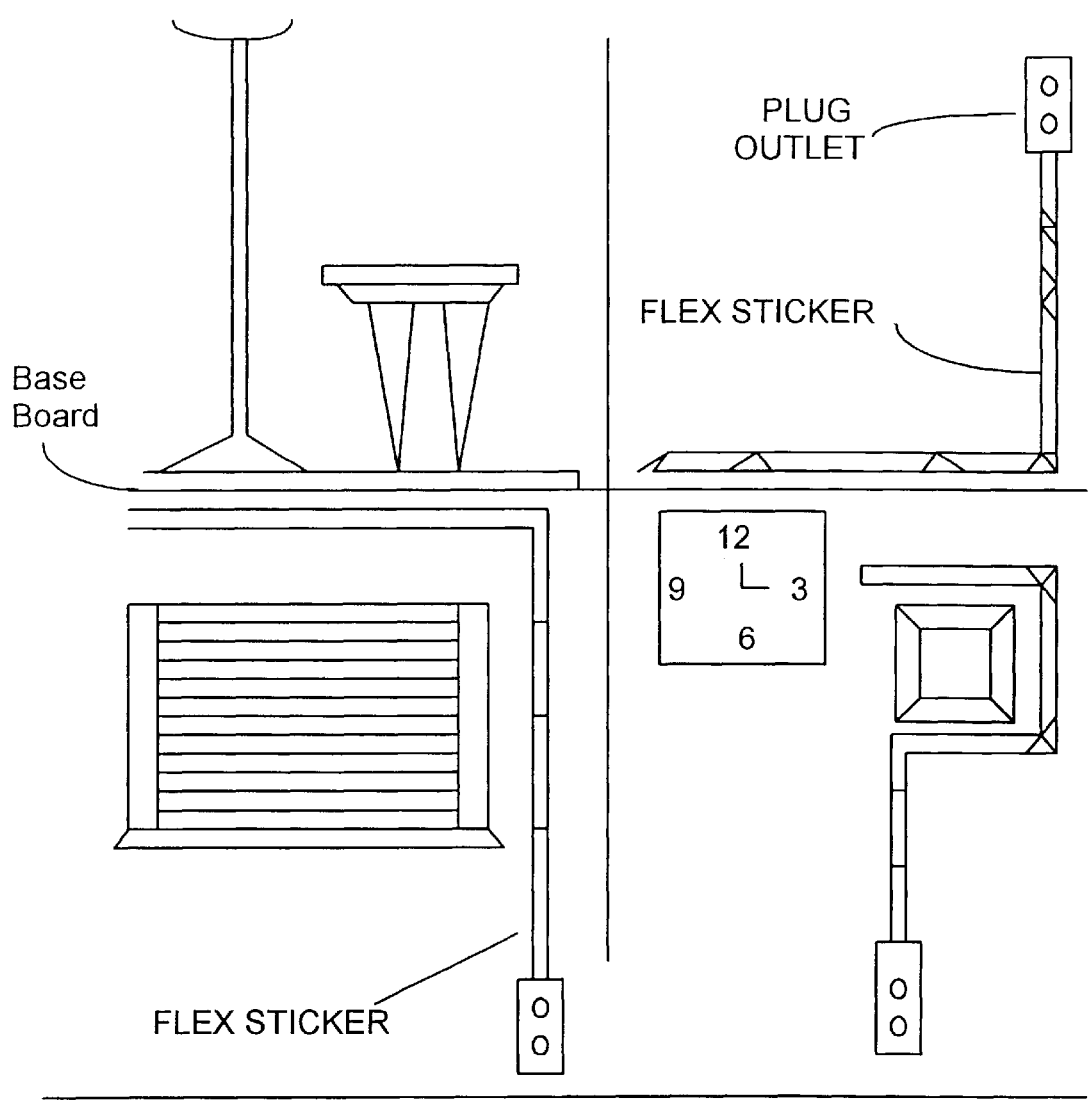

FIG. 12 Page 5 shows the various uses of THE FLEX-O-PLUG one may wish to use at home or the office. Including the use and placements of Velcro stickers.

Page 4, FIGS. 10, 11 demonstrate a FULL AND partial extension of the FLEX-O-PLUG(Sectional Conduit).

What I claim as my invention is:

An invention called THE FLEX-O-PLUG, to cover ugly cords and extension cords threw out ones home or office. To enhance ones environment.

1. A sectional conduit comprising:

a plurality of three-dimensional longitudinally extended sections with a rhombus cross section; said extended sections comprising four outer faces with grooves on the longitudinally extended sides of said extended sections for placing a wire or chord into said grooves, and two inner faces at each end of said extended sections;

a first three-dimensional wedge with a triangular cross section shorter in length than said extended sections; wherein on one inner connecting face of said first wedge are a plurality of small arm joint balls, and on another inner connecting face of said first wedge are corresponding holes;

a second three-dimensional wedge with a triangular cross section shorter in length than said extended sections and identical in size of the first three-dimensional wedge; wherein on one inner connecting face of said second wedge are a plurality of small arm joint balls, and on another inner connecting face of said second wedge are corresponding holes; and wherein said first three-dimensional wedge is placed opposite and in an upside-down relation of said second three-dimensional wedge; wherein said inner connecting face with said small arm joint balls of said first wedge align, are inserted, and snapped into said holes on said inner connecting face of said second wedge which form a rotating three-dimensional rhombus shaped conduit section smaller than said extended section.

2. The sectional conduit of claim 1, wherein said smaller rotating three-dimensional rhombus shaped conduit section is attached to said three-dimensional longitudinally extended sections by said small arm joint balls and corresponding holes of said inner connecting faces of said wedges.

* * * * *